(12) United States Patent
Flanders et al.

(10) Patent No.: US 10,386,005 B2
(45) Date of Patent: Aug. 20, 2019

(54) SELF-CONTAINED, FULLY MECHANICAL, 1 OUT OF 2 FLOWLINE PROTECTION SYSTEM

(71) Applicant: Saudi Arabian Oil Company, Dhahran (SA)

(72) Inventors: Patrick Flanders, Dhahran (SA); Austin Brell, Dhahran (SA); Michael Picou, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/992,356

(22) Filed: Jan. 11, 2016

(65) Prior Publication Data
US 2016/0201838 A1    Jul. 14, 2016

Related U.S. Application Data

(60) Provisional application No. 62/103,103, filed on Jan. 14, 2015.

(51) Int. Cl.
| | | |
|---|---|---|
| *F17D 1/20* | (2006.01) | |
| *F16K 17/02* | (2006.01) | |
| *F16L 55/07* | (2006.01) | |

(52) U.S. Cl.
CPC .............. *F16L 55/07* (2013.01); *F16K 17/02* (2013.01); *F17D 1/20* (2013.01)

(58) Field of Classification Search
CPC ........ F17D 3/00; F17D 1/20; Y10T 137/7761; F16K 17/02; F16K 31/12; B22D 18/08

(Continued)

(56) References Cited

U.S. PATENT DOCUMENTS

| | | | | |
|---|---|---|---|---|
| 3,367,367 A | * | 2/1968 | Kazuhiro ............... | B22D 18/08 137/614.11 |
| 4,196,750 A | * | 4/1980 | Peters ..................... | F16K 11/07 137/458 |

(Continued)

FOREIGN PATENT DOCUMENTS

| | | |
|---|---|---|
| EP | 2592318 A1 | 5/2013 |
| WO | 2012054295 A1 | 4/2012 |

OTHER PUBLICATIONS

International Search Report and Written Opinion for related PCT application PCT/US2016/013374 dated Apr. 5, 2016.

*Primary Examiner* — Angelisa L. Hicks
(74) *Attorney, Agent, or Firm* — Bracewell LLP; Constance G. Rhebergen; Linda L. Morgan

(57) ABSTRACT

A flowline protection system includes a first and second isolation valve connectable to a fully rated pipeline to prevent the flow of fluid through the fully rated pipeline when either of the isolation valves are in a closed position, interrupting the flow of fluids to a downstream underrated piping system to reduce the risk of overpressure or quantity of hydrocarbon released into the environment in the event of a line break. First and second hydraulic control assemblies each include high and low pressure safety pilot valves. Both the isolation valves return to the closed position if either high pressure safety pilot valve senses an operating pressure greater than a high pressure setting or if either low pressure safety pilot valve senses the operating pressure is less than a low pressure setting. The system is self-contained and free of a connection to any component other than the fully rated pipeline.

21 Claims, 5 Drawing Sheets

(58) Field of Classification Search
USPC .................. 137/487.5, 565.13; 251/18, 29
See application file for complete search history.

(56) References Cited

U.S. PATENT DOCUMENTS

| | | | |
|---|---|---|---|
| 4,240,463 A * | 12/1980 | Moore | F16K 17/00 137/458 |
| 5,621,164 A * | 4/1997 | Woodbury | G01M 3/2876 73/40.5 R |
| 6,478,048 B2 | 11/2002 | Hays | |
| 8,051,875 B2 | 11/2011 | Edwards | |
| 8,151,813 B2 | 4/2012 | Jacoby et al. | |
| 8,327,874 B2 | 12/2012 | Flanders | |
| 2005/0199286 A1 | 9/2005 | Appleford et al. | |
| 2008/0000529 A1 | 1/2008 | Edwards | |
| 2008/0078455 A1 | 4/2008 | Patterson | |
| 2011/0240157 A1 | 10/2011 | Jones et al. | |

\* cited by examiner

SELF-CONTAINED, FULLY MECHANICAL, 1 OUT OF 2 FLOWLINE PROTECTION SYSTEM

CROSS REFERENCE TO RELATED APPLICATIONS

This application claims priority to and the benefit of U.S. Provisional Application No. 62/103,103, titled "Self-Contained, Fully Mechanical, 1 Out Of 2 Flowline Protection System," filed Jan. 14, 2015, the full disclosure of which is hereby incorporated by reference herein in its entirety.

BACKGROUND OF THE DISCLOSURE

1. Field of the Disclosure

The present disclosure relates generally to the protection of flowlines against overpressure associated with hydrocarbon operations and in particular, to the reduction of risk and impact of overpressure through the introduction of mechanical high integrity flowline pressure protection systems and methods.

2. Description of the Related Art

In the oil and gas industry, production fluid pipelines downstream of the wellhead are typically designed to operate at certain pressures. An over pressure condition can occur under unusual operating conditions such as a closure of a valve within the downstream production flowline network. Pressure relief devices such as valves and flare and relief systems are present within downstream flowlines to limit the maximum pressure within the downstream flowlines to safe levels. Besides relief valves, other safeguards can be used to reduce the risk associated with overpressure conditions. Such safeguards include for example automated shutdown controls, sensors and valves that continuously monitor for overpressure conditions and isolate the source of high (dangerous) pressure within the segment of piping that is designed to withstand the maximum well shut-in pressure (fully rated pipe). Such overpressure protection systems may be used to address a flowline network design deficiency after-the-fact or may be used to minimize (optimize) the cost of the pipeline during system design. It can therefore be desirable to protect such flowlines and trunklines that carry wellhead production to separation facilities against excessive pressure that might rupture the pipe, which would have serious, negative consequences including lost production, environmental pollution, and potential for injury or loss of life associated with fire or H2S release. An excess pressure might occur, for example, if the flowline becomes blocked. Industry practice is to address this risk through the use of a safety instrumented system dedicated to protect the flowline from over-pressure. This type of safety instrumented system is commonly referred to as a high integrity protection system (HIPS).

A HIPS typically includes an electro-hydraulic system employing pressure sensors to measure the pressure in the flowlines (downstream pipes), with the process measurement being conveyed to a control module. The control module continuously compares the process pressure measurement to the safe pressure limit (setpoint) and takes action to close dedicated, redundant valves to create a physical barrier between the piping under protection and the high pressure wellhead source. This arrangement retains the high pressure within a section of pipeline that includes the production tree and the HIPS which is capable of withstanding the full, maximum wellhead topside pressure. This architecture enables the HIPS to prevent the downstream, lower rated, section of the pipeline from being exposed to pressure levels which may exceed the pipeline's pressure rating.

SUMMARY OF THE DISCLOSURE

Generally, HIPS utilize reliable well site electric power as the primary power source for electronic safety logic solvers and hydraulic power units. In remote locations where reliable power is not available, high pressure wells require a HIPS that is fully self-contained and able to provide the safety critical pressure protection without electrical power.

Embodiments of the present disclosure provide a Flowline Protection System (FPS) that is designed as a modular, fully self-contained system that meets industry standards for safety availability required for HIPS. The FPS provides a cost effective, self-contained, interchangeable, wellhead HIPS that can be installed on an oil or gas wellhead when required to protect downstream piping without any power or external connections. The FPS provides an independent safety layer when required on high pressure oil or gas wells without any electrical power. The FPS architecture provides a novel fully redundant, one-out-of-two voted, fail-safe design that offers a low total probability of failure and functional testing methods that together meet the risk reduction target demands of high pressure oil and gas wells. Although suited for remote well sites where there is no reliable electric power, the FPS can be deployed at any oil or gas well to protect flowlines from overpressure, for example, due to high wellhead shut-in pressures. The FPS of this disclosure is especially useful where high shut-in wellhead pressure justifies an additional, independent protection layer for downstream piping and where the number of potential wells that produced to a common trunk line exceed the risk-reduction capabilities of conventional HIPS. The FPS may also be deployed in a cluster type architecture, where multiple wells produce to a common fully rated manifold allowing a single FPS to protect downstream piping from multiple upstream wells.

A low probability of failure is achieved through the use of a novel architectural that includes redundancy of the process sensors (pressure pilots voted one-out-of-two), fail-safe design of internal control tubing and redundancy of the final elements (two isolation valves installed in series). Therefore, the FPS design ensures that both pipeline isolation valves respond to isolate the process when either of the two process connected pressure sensors detect dangerous pressure levels. The FPS of this disclosure is modular in design so that it can be factory assembled as a unit, moved to the well site and installed in the fully rated process piping as a complete unit. The FPS is designed to act as a stand alone, independent system that may be, installed and removed as a single interchangeable component, and can provide continuous monitoring of the piping pressure without any external power or connections to other safety systems. Once installed and commissioned, embodiments of this disclosure are designed to guard against overpressure 24 hours a day, 365 days a year and take action when required to prevent overpressure of pipelines downstream of the oil or gas well without operator intervention.

Systems and methods of this disclosure can also detect low pressure in the piping and close the pipeline isolation valves to reduce and mitigate the loss of oil and gas into the environment should a pipeline break occur due to physical damage. Therefore, the FPS of this disclosure can prevent the loss of oil and gas into the environment due to an unsafe high pressure demand and can reduce the impact of any flowline rupture or leak.

In an embodiment of this disclosure, an FPS for a fully rated pipeline, such as an oil or gas production flowline, is disclosed. The fully rated pipeline has a fluid, which can be a mixed media flowing from an oil or gas well source through the fully rated pipeline at an operation pressure. The FPS includes a first isolation valve and a second isolation valve. The first and second isolation valves are connected in series and can be connected to or installed within the fully rated pipeline to prevent the flow of the fluid through the fully rated pipeline when either the first isolation valve or the second isolation valve is in a closed position. During normal operations, both of the FPS isolation valves are in the fully open position. The FPS contains a first and second hydraulic control assembly. Each hydraulic control assembly includes a high pressure safety pilot valve with a high pressure setting, and a low pressure safety pilot valve with a low pressure setting. The first and second hydraulic control assemblies are configured to cause both the first isolation valve and the second isolation valve to move from the normal (open) position to the closed position (fail safe position) if either of the high pressure safety pilot valves sense that the operating pressure is greater than the high pressure setting. In a similar fashion, the FPS is designed to move both isolation valves from the normal (open) position to the fail-safe (closed) position if either of the low pressure safety pilot valves sense that the operating pressure is less than the low pressure setting. The isolation valves and the hydraulic control assemblies are all part of a self-contained, FPS skid that is free of any connection to other control components other than the fully rated pipeline.

In alternate embodiments, the first and second hydraulic control assemblies can be hydraulically operated mechanical systems that are free of electrical power or electrical communications. A first actuator can be associated with the first isolation valve. The first actuator can selectively maintain the first isolation valve in the open position, with a pressure media having an acceptable open hydraulic pressure applied to the first actuator. A second actuator associated the second isolation valve can selectively maintain the second isolation valve in the open position, with the pressure media having the acceptable open hydraulic pressure applied to the second actuator.

In other alternate embodiments, a pressure media container can be in fluid communication with each low pressure safety pilot valve so that when at least one of the low pressure safety pilot valves senses that the operating pressure is less than the low pressure setting, at least one of the low pressure safety pilot valves moves from a first position to a second position and the pressure media is drained into the pressure media container, reducing a pressure of the pressure media below the open hydraulic pressure, resulting in both of the isolation valves moving to the closed position. The pressure media container can alternately be in fluid communication with each high pressure safety pilot valve so that when at least one of the high pressure safety pilot valves senses that the operating pressure is greater than the high pressure setting, the at least one of the high pressure safety pilot valves moves from a first position to a second position and the pressure media is drained into the pressure media container, reducing a pressure of the pressure media below the open hydraulic pressure, resulting in both of the isolation valves moving to the closed position. A fully rated interconnecting spool pipe can be located between the first isolation valve and second isolation, the fully rated interconnecting spool pipe having a pressure gauge and a vent valve for use during field level isolation valve leak testing.

In yet other alternate embodiments, a first hand pump can provide the open hydraulic pressure to move the first isolation valve to the open position. A second hand pump can provide the open hydraulic pressure to move the second isolation valve to the open position. A first high pressure accumulator can be in fluid communication with the first actuator and a second high pressure accumulator can be in fluid communication with the second actuator. Each high pressure accumulator can selectively store a pressure media at the open pressure.

In still other embodiments, each of a first pressure transfer assembly and a second pressure transfer assembly can have a barrier that isolates the fluid of the fully rated pipeline from a pressure media of the first and second hydraulic control assemblies. The first and second pressure transfer assemblies can each be in hydraulic communication with both the first high pressure safety pilot valve and the second high pressure safety pilot valve, and can convey a magnitude of the operating pressure. The flowline protection system can be located upstream of an underrated pipeline system, and the system can interrupt the flow of fluid to the underrated pipeline system when either the first isolation valve or the second isolation valve is in a closed position.

In an alternate embodiment of this disclosure an FPS for a fully rated pipeline includes a first isolation valve and a second isolation valve. The fully rated pipeline has a fluid flowing through the fully rated pipeline at an operation pressure. The first and second isolation valves are connected in series and are connectable to the fully rated pipeline to prevent the flow of a fluid through the fully rated pipeline when either the first isolation valve or the second isolation valve is in a closed position. A first actuator can be associated with the first isolation valve. The first actuator can selectively maintain the first isolation valve in the open position with a pressure media having a first open hydraulic pressure applied to the first actuator. A second actuator can be associated with the second isolation valve. The second actuator can selectively maintain the second isolation valve in the open position with the pressure media having a second open hydraulic pressure applied to the second actuator. A first and second hydraulic control assembly can each be in hydraulic communication with both the first and second actuators and can selectively provide the first open hydraulic pressure and the second open hydraulic pressure. The first hydraulic control assembly can have a first high pressure safety pilot valve with a high pressure setting and the second hydraulic control assembly can have a second high pressure safety pilot valve with the high pressure setting. The first and second hydraulic control assemblies can be configured to cause both the first isolation valve and the second isolation valve to move from the normal (open) position to the fail-safe (closed) position if either the first high pressure safety pilot valve or the second high pressure safety pilot valve sense that the operating pressure is greater than the high pressure setting.

In alternate embodiments, a skid can support the assembled FPS including the isolation valves, interconnecting spool pipe, the actuators the hydraulic control assemblies and the sensor connections. The system can have a first pipeline flange face and a second pipeline flange face for connecting the skid mounted FPS to the fully rated pipeline. The assembled FPS can be self-contained and stand alone, such that the system is free of a connection to any component other than the fully rated pipeline. The first hydraulic control assembly can have a first low pressure safety pilot valve with a low pressure setting and the second hydraulic control assembly can have a second low pressure safety pilot valve with the low pressure setting. The first and second hydraulic control assemblies can be configured to cause both the first isolation valve and the second isolation valve to move from the normal (open) position to the fail-safe (closed) position if either the first low pressure safety pilot valve or the second low pressure safety pilot valve sense that the operating pressure is less than the low pressure setting.

In other alternate embodiments, a pressure media container can be in fluid communication with each low pressure safety pilot valve so that when one of the low pressure safety pilot valves senses that the operating pressure is less than the low pressure setting, one of the low pressure safety pilot valves moves from a first position to a second position and the pressure media is drained into the pressure media container, reducing a pressure of the pressure media below at least one of the operating hydraulic pressures and resulting in at least one of the isolation valves moving to the closed position. Alternately, the pressure media container can be in fluid communication with each high pressure safety pilot valve so that when at least one of the high pressure safety pilot valve senses that the operating pressure is greater than the high pressure setting, at least one high pressure safety pilot valve moves from a first position to a second position and the pressure media is drained into the pressure media container, reducing a pressure of the pressure media below at least one of the operating hydraulic pressures and resulting in at least one of the isolation valves moving to the closed position.

In another alternate embodiment of this disclosure, a method for protecting a fully rated pipeline can include providing an FPS. The FPS can have a first isolation valve, a second isolation valve, and a first and second hydraulic control assembly. Each of the hydraulic control assemblies can include a high pressure safety pilot valve with a high pressure setting, and a low pressure safety pilot valve with a low pressure setting. The flowline protection system can be connected to the fully rated pipeline so that the first and second isolation valves are in series and are operable to prevent the flow of the fluid through the fully rated pipeline when either the first isolation valve or the second isolation valve is in a closed position. The FPS can be self-contained and free of a connection to any component other than the fully rated pipeline. A fluid can be flowed through the fully rated pipeline at a normal, operation pressure. The operating pressure can be sensed with the high pressure safety pilot valves and the low pressure safety pilot valves so that the first and second hydraulic control assemblies cause both of the isolation valves to return to the closed position if either of the high pressure safety pilot valves sense that the operating pressure is greater than the high pressure setting or if either of the low pressure safety pilot valves sense that the operating pressure is less than the low pressure setting.

In alternate embodiments, the FPS has a first hand pump and a second hand pump. Before flowing the fluid through the fully rated pipeline at the operation pressure, the first hand pump can be used to provide the open hydraulic pressure to move the first isolation valve to an open position and the second hand pump can be used to provide the open hydraulic pressure to move the second isolation valve to an open position. The FPS can have a first actuator associated with the first isolation valve and a second actuator associated the second isolation valve. Before flowing the fluid through the fully rated pipeline at the operation pressure, the first isolation valve can be maintained in the open position with a pressure media having an open hydraulic pressure applied to the first actuator, and the second isolation valve can be maintained in the open position with the pressure media having the open hydraulic pressure applied to the second actuator. After the isolation valves are returned to the closed position, the flowline protection system can be reset by using the first hand pump to provide the open hydraulic pressure to move the first isolation valve to an open position, and using the second hand pump to provide the open hydraulic pressure to move the second isolation valve to an open position. A downstream underrated pipeline system can be protected from overpressure by interrupting the flow of fluid to the downstream underrated pipeline system when either the first isolation valve or the second isolation valve is in a closed position

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION OF THE EXEMPLARY EMBODIMENTS

Embodiments of the present disclosure will now be described more fully hereinafter with reference to the accompanying drawings which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
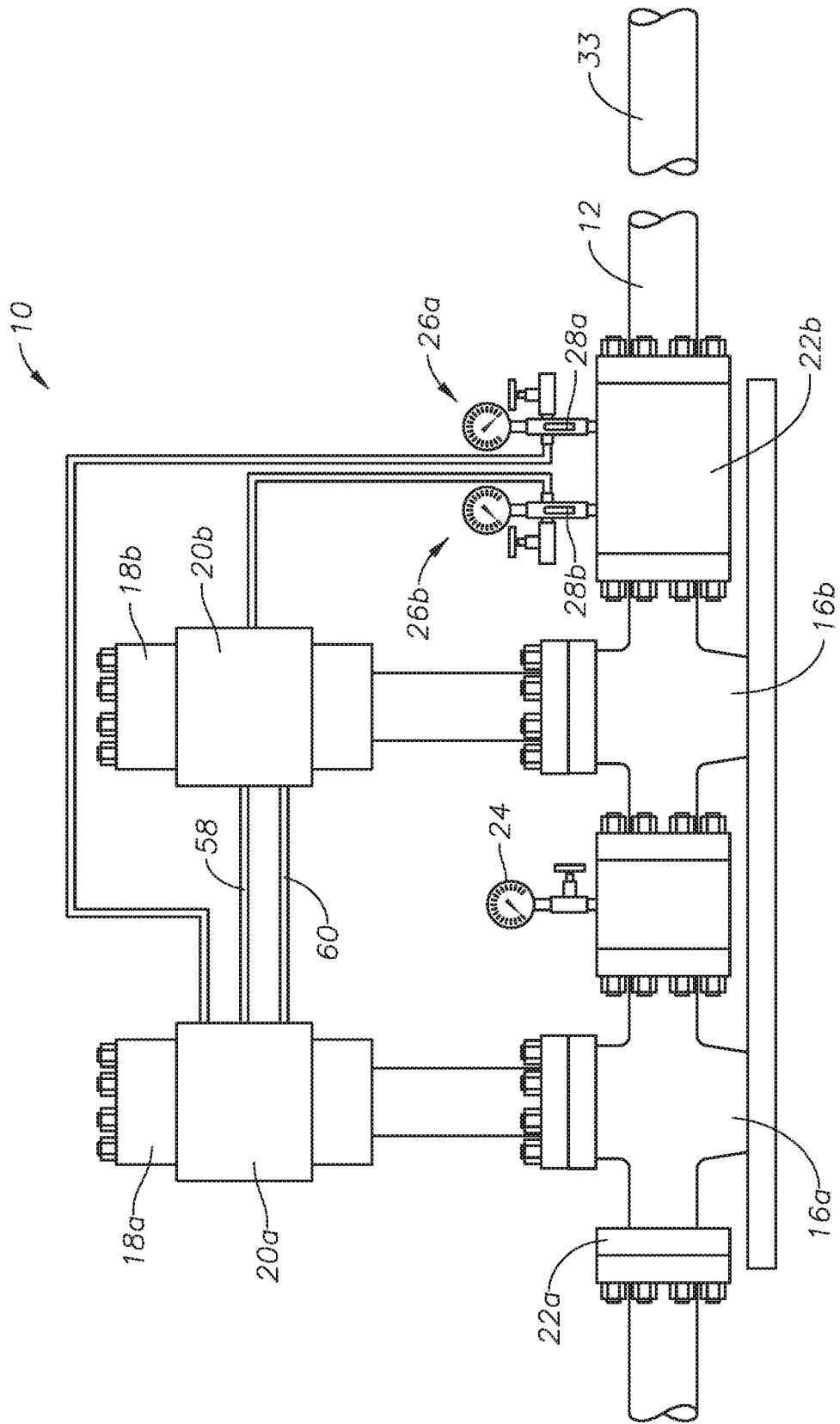
FIG. 1 is an elevation view of a self-contained FPS of an embodiment of this disclosure.

Looking at FIG. 1, flowline protection system (FPS) 10 is a self-contained and stand alone assembly that is free of a connection to any component other than fully rated pipeline 12. Fully rated pipeline 12 is rated to the maximum well shut-in pressure. Alternately, fully rated pipeline 12 is rated to a required operating pressure of the piping system. Skid 14 supports the other components of FPS 10, including isolation valves 16a, 16b, actuators 18a, 18b, fully rated interconnecting spool pipe, and hydraulic control systems 20a, 20b. FPS 10 is a flange-to-flange system in that it is a self-contained and stand alone unit that can be installed between traditional pipeline flanges, requiring no external connections other than such traditional mechanical flange connections. FPS 10 has a first pipeline flange face 22a and a second pipeline flange face 22b for connecting FPS 10 to fully rated pipeline 12. Skid 14 contains all components required for the functionality of FPS 10. No outside power source or other communication connection is required for FPS 10 to function.

Fully rated pipeline 12 can be a pipeline carrying oil and gas and be part of a system associated with a hydrocarbon production well. Fluids flow through fully rated pipeline 12 from first pipeline flange face 22a towards second pipeline flange face 22b at an operating pressure. The fluids pass through bores of isolation valves 16a, 16b, which are connected in series to fully rated pipeline 12, when isolation valves 16a, 16b are in the normal operating (open) position. If one of the isolation valves 16a, 16b move to a closed position, fluid is prevented from passing through the bores of such isolation valve 16a, 16b, and the fluid is prevented from passing through fully rated pipeline 12 past FPS 10. A pressure gauge 24 can be located on a fully rated interconnecting spool pipe, between first isolation valve 16a and second isolation valve 16b to display the operating pressure of the fluids flowing through FPS 10. A valve can be associated with pressure gauge 24 to stop the flow of fluids to pressure gauge 24 when desired. The fully rated interconnecting spool pipe can also have a vent valve for use during field level isolation valve leak testing. Pressure gauge 24 can display a pressure during the routine functional testing of the FPS. Pressure gauge 24 can provide an indication of abnormal pressure in the interconnecting piping spool between isolation valve 16a and 16b that alerts operations to the need for maintenance of the FPS.

Figure 2:
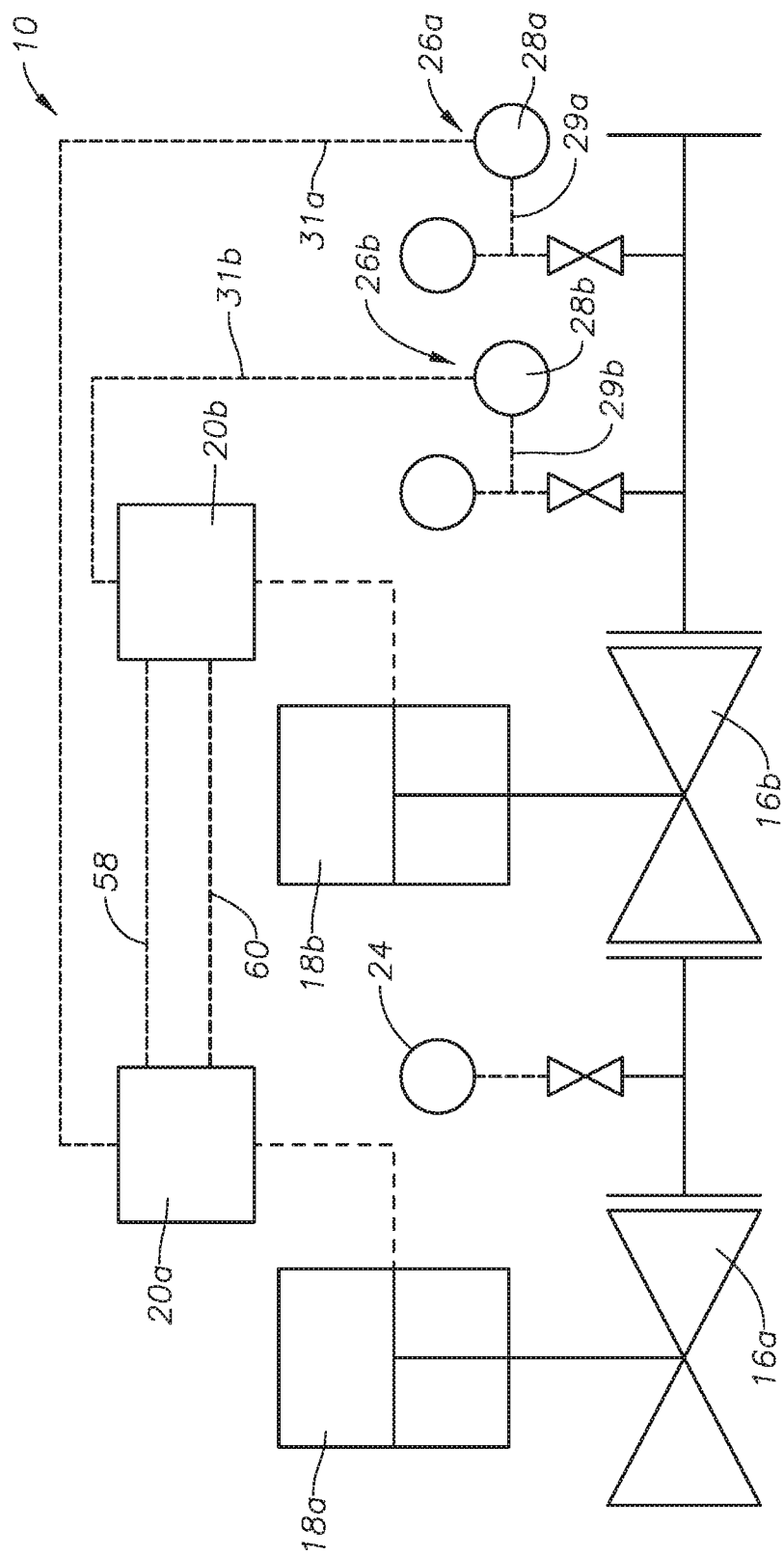
FIG. 2 is a schematic diagram of the self-contained FPS of FIG. 1.

Looking at FIGS. 1-2, first actuator 18a is associated with first isolation valve 16a and second actuator 18b is associated with second isolation valve 16b. Each actuator 18a, 18b can be a spring close actuator so that if no pressure input is provided to actuators 18a, 18b, the actuators 18a, 18b move to, and stay in, a closed position so that the associated isolation valves 16a, 16b will move to, and stay in, a closed position (fail-safe design). Therefore isolation valves 16a, 16b are open during normal, producing operations and closed when the well is off-line. Isolation valves 16a, 16b can be normally open, fail closed design such that isolation valves 16a, 16b fail-safe to the closed position. When actuator 18a, 18b, is provided with sufficient hydraulic pressure, actuators 18a, 18b will overcome the spring force and can move isolation valves 16a, 16b, respectively, to the open position. The magnitude of required pressure can be known as the open hydraulic pressure. Continued open hydraulic pressure is required to maintain isolation valves 16a, 16b in the open position.

First hydraulic control system 20a is associated with first actuator 18a and first isolation valve 16a. Second hydraulic control system 20b is associated with second actuator 18b and second isolation valve 16b. As will be further described below, first hydraulic control system 20a is also in hydraulic fluid communication with second hydraulic control system 20b and can therefore control both isolation valves 16a, 16b. Similarly, second hydraulic control system 20b is also in hydraulic and fluid communication with first hydraulic control system 20a and can therefore control both isolation valves 16a, 16b.

FPS 10 has a first pressure transfer assembly 26a and a second pressure transfer assembly 26b. Each of the pressure transfer assemblies 26a, 26b include a hydraulic pressure pilot 28a, 28b, respectively, that has a barrier that isolates the fluid of the pipeline from a pressure media of the first and second hydraulic control systems 20a, 20b. Each of the pressure transfer assemblies 26a, 26b can also include a pressure gauge for displaying the pressure of the fluid in fully rated pipeline 12 and a valve to control the fluid of pipeline fluid to the pressure gauge and to hydraulic pressure pilot 28a, 28b. Hydraulic pressure pilot 28a, 28b can convey a magnitude of the operating pressure of the fluid of fully rated pipeline 12 to the hydraulic control systems 20a, 20b, while maintaining the separation of the fluid of fully rated pipeline 12 and the pressure media of the hydraulic control systems 20a, 20b. Therefore, only fluid from fully rated pipeline 12 will be present in pre-valve lines 29a, 29b and only pressure media will be present in post valve lines 31a, 31b.

Figure 3:
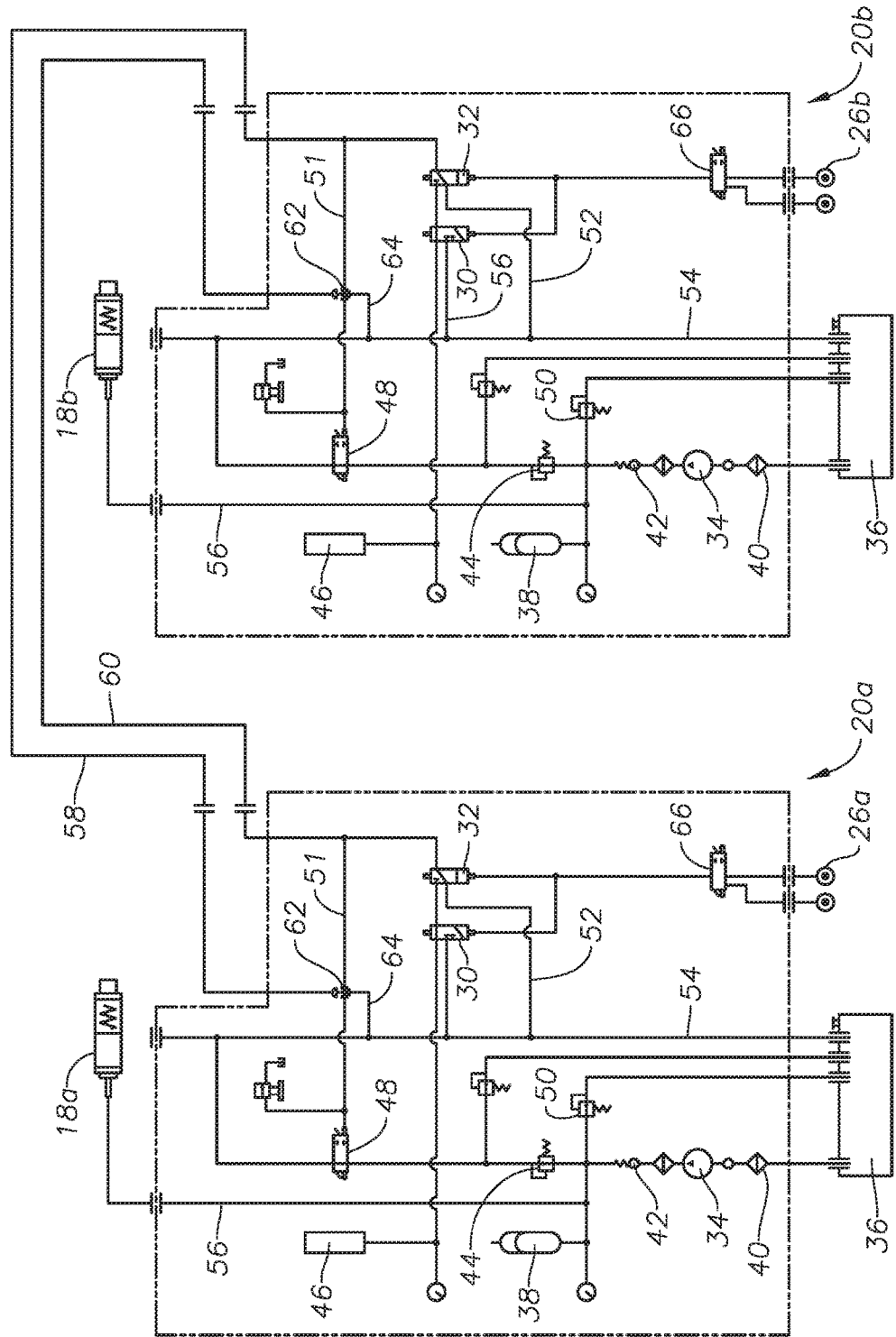
FIG. 3 is a schematic diagram of the control units of the self-contained (FPS) of FIG. 1, shown with the high pressure safety pilot valves in an operating position and the low pressure safety pilot valves in a tripped position.

Looking now at FIG. 3, each hydraulic control system 20a, 20b includes a high pressure safety pilot valve 30 with a high pressure setting, and a low pressure safety pilot valve 32 with a low pressure setting. High pressure safety pilot valve 30 and low pressure safety pilot valve 32 are in fluid communication with one or both of the pressure transfer assemblies 26a, 26b. The magnitude of the operating pressure is conveyed by hydraulic pressure to high pressure safety pilot valve 30 and low pressure safety pilot valve 32. As will be described in further detail, each hydraulic control system 20a, 20b is configured to cause at least one, and preferably both, of the first isolation valve 16a and the second isolation valve 16b to move from the normal (open) operating position to the closed (fail-safe) position if either of the high pressure safety pilot valves 30 sense that the operating pressure is greater than the high pressure setting or if either of the low pressure safety pilot valves 32 sense that the operating pressure is less than the low pressure setting.

In order to pressurize the hydraulic control systems 20a, 20b, a hand pump 34 of each of the hydraulic control systems 20a, 20b can be used to pump pressure media from pressure media container 36 into hydraulic control systems 20a, 20b to at least the open hydraulic pressure. This will provide sufficient pressure to overcome the spring force of actuators 18a, 18b so that isolation valves 16a, 16b can move to, and be maintained in, the open position. High pressure container 36 is in fluid communication with actuators 18a, 18b and can store pressure media at or above open hydraulic pressure. Filters 40 can filter the pressure media being pumped by hand pump 34 and check valves 42 can allow pressure media to be pumped out of pressure media container 2436 while preventing pressure media from returning through the hydraulic line of hand pump 34 back to the pressure media container 36.

Figure 5:
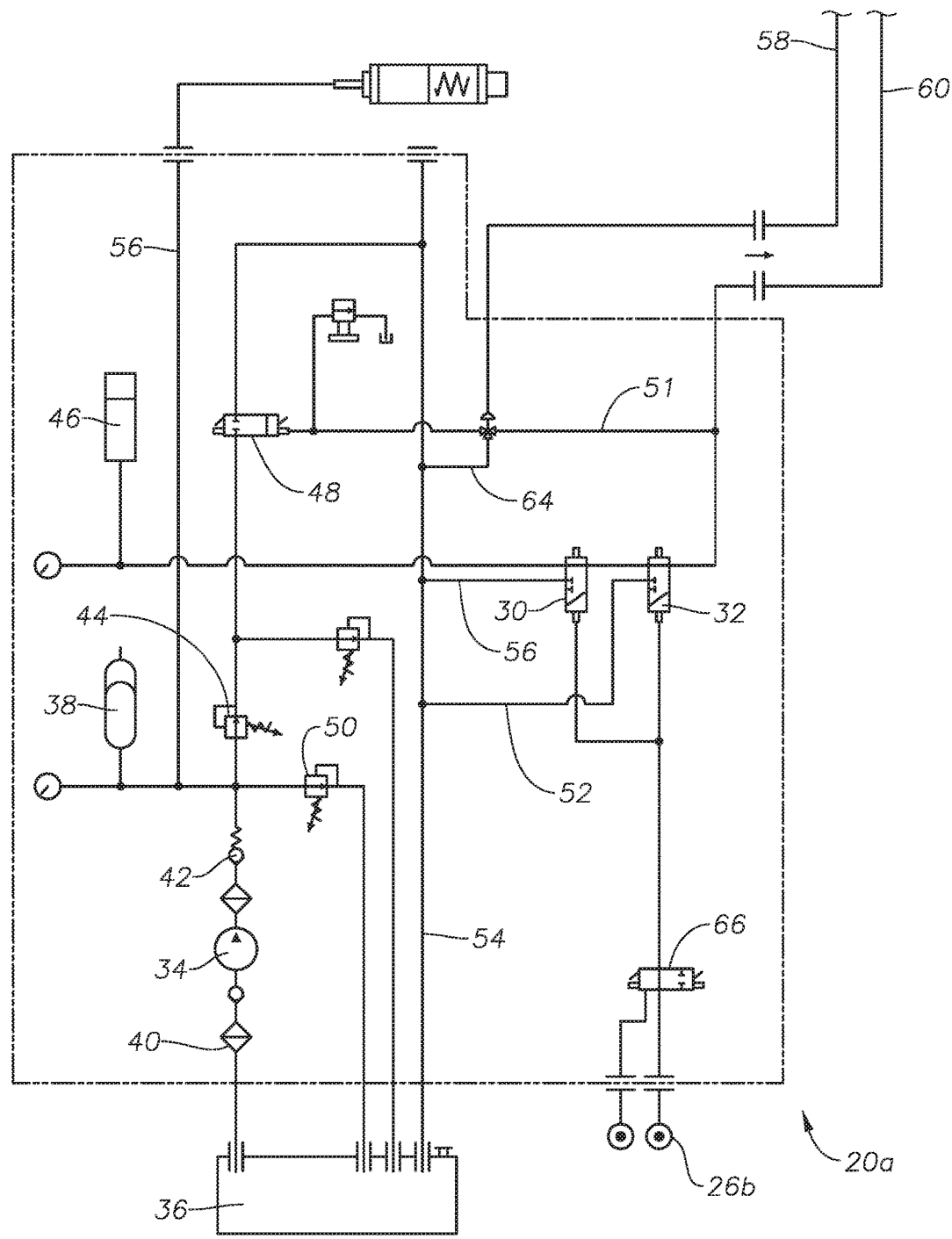
FIG. 5 is a schematic diagram of a portion of the control unit of FIG. 3, shown with the high pressure safety pilot valve in the operating position and the low pressure safety pilot valve in the operating position.

Actuators 18a, 18b and the high pressure accumulators define a higher hydraulic pressure system. Other components of the hydraulic control systems 20a, 20b can be operated with lower hydraulic pressures. Pressure regulator 44 can step down the pressure media of the higher hydraulic pressure system for use with a lower hydraulic pressure system. Low pressure accumulator 46 can store pressure media at a pressure below the open hydraulic pressure. Pressure media stored in low pressure accumulator 46 can be used to maintain hydraulic piloted valve 48 in a closed position. When hydraulic piloted valve 48 is in a closed position, and both high pressure safety pilot valve 30 and low pressure safety pilot valve 32 are in operating positions (FIG. 5) pressure media of the hydraulic control systems 20a, 20b is retained within the hydraulic control systems 20a, 20b. Safety valves 50 along certain of the hydraulic lines of the hydraulic control systems 20a, 20b can be used to provide a path for the pressure media to escape to pressure media container 36 if unsafe high pressure conditions exist in hydraulic control systems 20a, 20b.

When hydraulic piloted valve 48 is in an open position, pressure media of the hydraulic control systems 20a, 20b can drain into pressure media container 36 so that the pressure media of the higher hydraulic pressure system drops below the open hydraulic pressure and isolation valves 16a, 16b return to the closed position. Pressure media container 36 is in fluid communication with low pressure safety pilot valve 32 so that when low pressure safety pilot valve 32 senses that the operating pressure is less than the low pressure setting, the low pressure safety pilot valve 32 moves from a first position to a second position and the pressure media can drain into the pressure media container 36, reducing a pressure of the pressure media below the open hydraulic pressure and resulting in the isolation valves 16a, 16b moving to the closed position.

As an example, looking at FIG. 3, low pressure safety pilot valve 32 is in a tripped position so that pressure media in the hydraulic line 51, which is in communication with hydraulic piloted valve 48, can drain through low pressure safety pilot valve 32 and continue through drain subline 52 to main drain line 54 and into pressure media container 36. This will cause hydraulic piloted valve 48 to move to an open position, allowing pressure media in actuators 18a, 18b to drain through actuator line 56, pass through pressure regulator 44 and hydraulic piloted valve 48, and drain into pressure media container 36 through main drain line 54. This loss of pressure media from actuators 18a, 18b will cause the springs of actuators 18a, 18b to move isolation valves 16a, 16b to the closed (fail-safe) position.

Similarly, pressure media container 36 is in fluid communication with high pressure safety pilot valve 30 so that when high pressure safety pilot valve 30 senses that the operating pressure is greater than the high pressure setting, the high pressure safety pilot valve 30 moves from a first position to a second position and the pressure media can be drained into pressure media container 36, reducing a pressure of the pressure media below the open hydraulic pressure and resulting in the isolation valves 16a, 16b moving to the closed (fail-safe) position.

Figure 4:
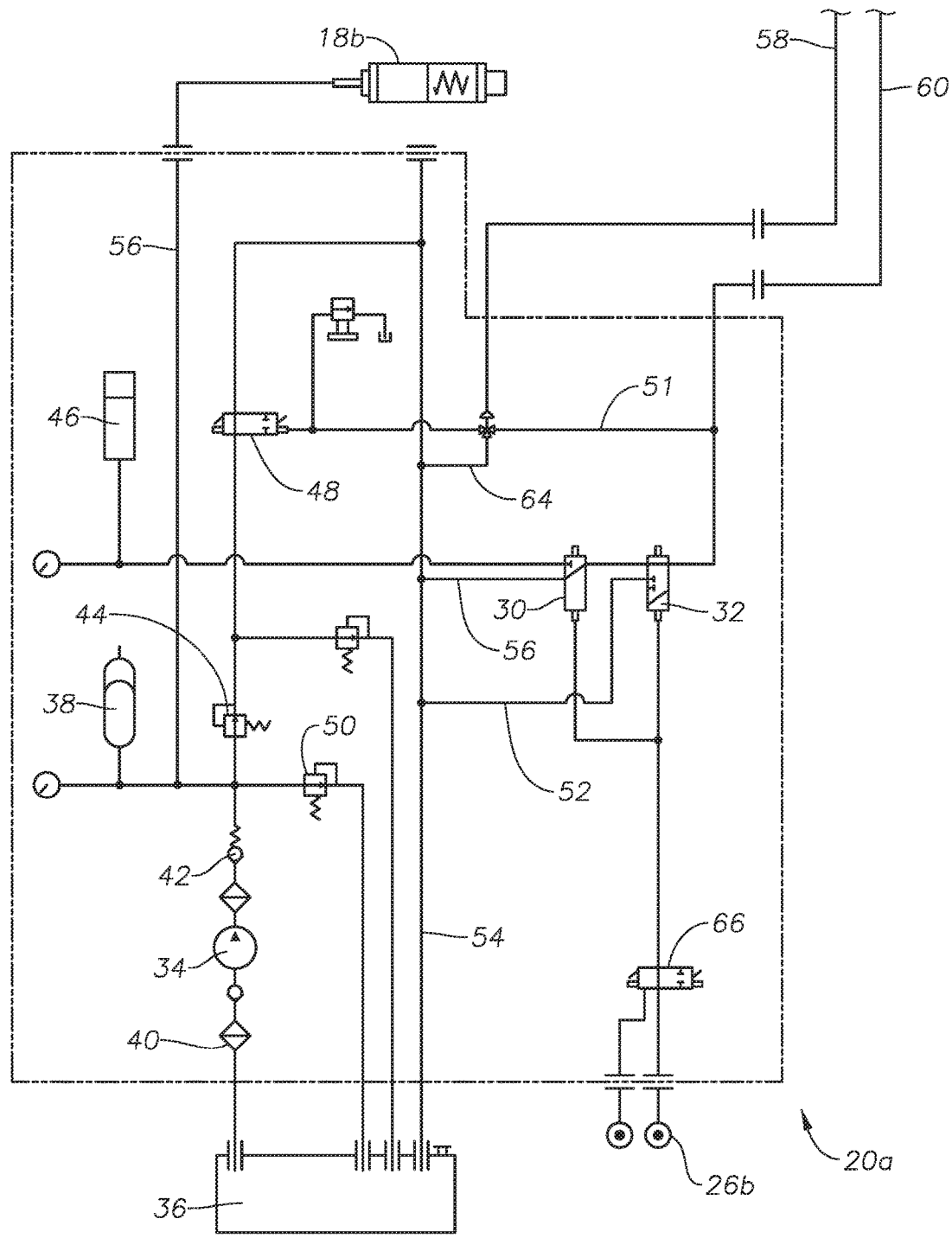
FIG. 4 is a schematic diagram of a portion of the control unit of FIG. 3, shown with the high pressure safety pilot valve in a tripped position and the low pressure safety pilot valve in an operating position.

As an example, looking at FIG. 4, high pressure safety pilot valve 30 is in a tripped position so that pressure media in the hydraulic line 51, which is in communication with hydraulic piloted valve 48, can pass through low pressure safety pilot valve 32 and continue to high pressure safety pilot valve 30, where it is directed to drain through actuator line 56 and through to main drain line 54 and into pressure media container 36. This will cause hydraulic piloted valve 48 to move to an open position, allowing pressure media in actuators 18a, 18b to drain through actuator line 56, pass through pressure regulator 44 and hydraulic piloted valve 48 and drain into pressure media container 36 through main drain line 54. This loss of pressure media from actuators 18a, 18b will cause the springs of actuators 18a, 18b to move isolation valves 16a, 16b to the closed (fail-safe) position.

Hydraulic line 51 of each of the hydraulic control systems 20a, 20b are in fluid communication with each other. This means that where either one or both high pressure safety pilot valves 30 or one or both low pressure safety pilot valves 32 is in a tripped position, both isolation valves 16a, 16b can move from the normal (open) position to the closed (fail-safe) position. As an example, if both of the high pressure safety pilot valves 30 and both of the low pressure safety pilot valves 32 are in an operating position (FIG. 5), then pressure media in hydraulic line 51 of second hydraulic control system 20b can travel though hydraulic cross-over 58 to hydraulic line 51 of first hydraulic control system 20a. Similarly, pressure media in hydraulic line 51 of first hydraulic control system 20a can travel though hydraulic cross-over 60 to hydraulic line 51 of second hydraulic control system 20b. However, as an example looking at FIG. 2, if one of the low pressure safety pilot valves 32 is tripped, such as the low pressure safety pilot valve 32 of first hydraulic control system 20a, then pressure media will no longer travel through hydraulic cross-over 60, and cross-over valve 62 will allow pressure media in hydraulic line 51 of second hydraulic control system 20b to drain through hydraulic cross-over 60, through cross-over valve 62 of first hydraulic control system 20a, pass through drain subline 64 and out main drain line 54 to pressure media container 36.

Hydraulic control systems 20a, 20b also include test valve 66. When test valve 66 is moved from a first position to a second position, instead of receiving fluids from fully rated pipeline 12, a test fluid can be used to test the operability of hydraulic control systems 20a, 20b.

Looking at FIG. 1, in an example of operation, FPS 10 is connected to fully rated pipeline 12 so that first and second isolation valves 16a, 16b are in series and are operable to prevent the flow of the fluid through fully rated pipeline 12 when either the first isolation valve 16a or the second isolation valve 16b is in a closed (fail-safe) position, and wherein the FPS 10 is self-contained and free of a connection to any component other than fully rated pipeline 12.

Hand pumps 34 can be operated to provide the open hydraulic pressure to both hydraulic control systems 20a, 20b to move the isolation valves 16a, 16b to an open position. Isolation valves 16a, 16b can be maintained in the open position with a pressure media having an open hydraulic pressure applied to the actuators 18a, 18b. Looking at FIG. 5, fluids can then flow through fully rated pipeline 12. The operation pressure will be sensed by high pressure safety pilot valves 30 and low pressure safety pilot valves 32. If either of the high pressure safety pilot valves 30 sense that the operating pressure is greater than the high pressure setting, or if either of the low pressure safety pilot valves 32 sense that the operating pressure is less than the low pressure setting, then the applicable high pressure safety pilot valve 30 or low pressure safety pilot valve 32 will move from the operating position to the tripped position and the pressure media will drain from both hydraulic control systems 20a, 20b, as described above. Isolation valves 16a, 16b will move from the normal (open) position to the closed (fail-safe) position.

In this manner, FPS 10 is a fully redundant, 1-out-of-2 system in that even upon the failure of one of the isolation valves 16a, 16b, one of the actuators 18a, 18b, or the failure of one of the hydraulic control systems 20a, 20b, including the failure of one of the high pressure safety pilot valves 30 or low pressure safety pilot valves 32, FPS 10 can still operate to close at least one of the isolation valves 16a, 16b to stop the flow of fluid through fully rated pipeline 12 to protect downstream pipeline 33 and equipment or reduce the quantity of hydrocarbon released into the environment in the event of a line break. Downstream pipeline 33 and associated instruments and equipment can be part of a downstream underrated pipeline system.

After the operating pressure has reached an acceptable level and the reason for the high or low pressure event has been addressed, FPS 10 can be reset by once again using hand pump 34 of each of the hydraulic control systems 20a, 20b to pump pressure media from pressure media container 36 into hydraulic control systems 20a, 20b in order to pressurize the hydraulic control systems 20a, 20b to at least the open hydraulic pressure.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A flowline protection system for a fully rated pipeline, the fully rated pipeline having a fluid flowing through the fully rated pipeline at an operation pressure, the system comprising:
    a first isolation valve and a second isolation valve, the first and second isolation valves being connected in series and connectable to the fully rated pipeline to prevent a flow of the fluid through the fully rated pipeline when either the first isolation valve or the second isolation valve is in a closed position;
    a first and second hydraulic control assembly, each of the hydraulic control assemblies including a high pressure safety pilot valve with a high pressure setting, and a low pressure safety pilot valve with a low pressure setting;
    a hydraulic cross-over extending from the first hydraulic control assembly to the second hydraulic control assembly, the hydraulic cross-over operable to drain a pressure media from one of the first hydraulic control assembly and the second hydraulic control assembly into a media container of the other of the first hydraulic control assembly and the second hydraulic control assembly, reducing a pressure of the pressure media below an open hydraulic pressure so that both the first isolation valve and the second isolation valve move to a closed position;
    a first pressure transfer assembly and a second pressure transfer assembly, each of the pressure transfer assemblies having an unopenable barrier that isolates the fluid of the fully rated pipeline from the pressure media of the first and second hydraulic control assemblies, wherein the first and second pressure transfer assemblies are each in hydraulic communication with both the first high pressure safety pilot valve and the second high pressure safety pilot valve, and convey a magnitude of the operating pressure; wherein
    the pressure media is separate from the fluid flowing through the fully rated pipeline;
    the first and second hydraulic control assemblies are configured to cause both the first isolation valve and the second isolation valve to return to the closed position if either of the high pressure safety pilot valves sense that the operating pressure is greater than the high pressure setting or if either of the low pressure safety pilot valves sense that the operating pressure is less than the low pressure setting; and wherein
    the isolation valves and the hydraulic control assemblies are part of a self-contained skid assembly free of a connection to any component other than the fully rated pipeline.

2. The system according to claim 1, further comprising:
    a first actuator associated the first isolation valve, the first actuator selectively maintaining the first isolation valve in the open position with the pressure media having the open hydraulic pressure applied to the first actuator; and
    a second actuator associated the second isolation valve, the second actuator selectively maintaining the second isolation valve in the open position with the pressure media having the open hydraulic pressure applied to the second actuator.

3. The system according to claim 2, further comprising the pressure media container in fluid communication with each low pressure safety pilot valve so that when at least one of the low pressure safety pilot valves senses that the operating pressure is less than the low pressure setting, the at least one of the low pressure safety pilot valves moves from a first position to a second position and the pressure media is drained into the pressure media container, reducing a pressure of the pressure media below the open hydraulic pressure and resulting in the isolation valves moving to the closed position.

4. The system according to claim 2, further comprising the pressure media container in fluid communication with each high pressure safety pilot valve so that when at least one of the high pressure safety pilot valves senses that the operating pressure is greater than the high pressure setting, the at least one of the high pressure safety pilot valves moves from a first position to a second position and the pressure media is drained into the pressure media container, reducing a pressure of the pressure media below the open hydraulic pressure and resulting in the isolation valves moving to the closed position.

5. The system according to claim 2, further comprising a first hand pump for providing the open hydraulic pressure to move the first isolation valve to the open position, and a second hand pump for providing the open hydraulic pressure to move the second isolation valve to the open position.

6. The system according to claim 2, further comprising a first high pressure accumulator in fluid communication with the first actuator and a second high pressure accumulator in fluid communication with the second actuator, each high pressure accumulator selectively storing the pressure media at the open pressure.

7. The system according to claim 1, wherein the first and second hydraulic control assemblies are hydraulically operated mechanical systems free of electrical power or electrical communications.

8. The system according to claim 1, wherein a fully rated interconnecting spool pipe is located between the first isolation valve and second isolation, the fully rated interconnecting spool pipe having a pressure gauge and a vent valve for use during field level isolation valve leak testing.

9. The system according to claim 1, wherein the flowline protection system is located upstream of an underrated pipeline system, and wherein the system interrupts the flow of fluid to the underrated pipeline system when either the first isolation valve or the second isolation valve is in a closed position.

10. A flowline protection system for a fully rated pipeline, the fully rated pipeline having a fluid flowing through the fully rated pipeline at an operation pressure, the system comprising:
- a first isolation valve and a second isolation valve, the first and second isolation valves being connected in series and connectable to the fully rated pipeline to prevent a flow of a fluid through the fully rated pipeline when either the first isolation valve or the second isolation valve is in a closed position;
- a first actuator associated the first isolation valve, the first actuator selectively maintaining the first isolation valve in the open position with a pressure media having a first open hydraulic pressure applied to the first actuator, where the pressure media is separate from the fluid flowing through the fully rated pipeline;
- a second actuator associated the second isolation valve, the second actuator selectively maintaining the second isolation valve in the open position with the pressure media having a second open hydraulic pressure applied to the second actuator;
- a first and second hydraulic control assembly, each of the first and second hydraulic control assemblies being in hydraulic communication with both the first and second actuators and selectively providing the first open hydraulic pressure and the second open hydraulic pressure, the first hydraulic control assembly having a first high pressure safety pilot valve with a high pressure setting and the second hydraulic control assembly having a second high pressure safety pilot valve with the high pressure setting;
- a hydraulic cross-over extending from the first hydraulic control assembly to the second hydraulic control assembly, the hydraulic cross-over operable to drain the pressure media from one of the first hydraulic control assembly and the second hydraulic control assembly into a media container of the other of the first hydraulic control assembly and the second hydraulic control assembly, reducing a pressure of the pressure media below the open hydraulic pressure;
- a first pressure transfer assembly and a second pressure transfer assembly, each of the pressure transfer assemblies having an unopenable barrier that isolates the fluid of the fully rated pipeline from the pressure media of the first and second hydraulic control assemblies, wherein the first and second pressure transfer assemblies are each in hydraulic communication with both the first high pressure safety pilot valve and the second high pressure safety pilot valve, and convey a magnitude of the operating pressure; and wherein
- the first and second hydraulic control assemblies are configured to cause both the first isolation valve and the second isolation valve to return to the closed position if either the first high pressure safety pilot valve or the second high pressure safety pilot valve sense that the operating pressure is greater than the high pressure setting.

11. The system according to claim 10, wherein the first hydraulic control assembly has a first low pressure safety pilot valve with a low pressure setting and the second hydraulic control assembly has a second low pressure safety pilot valve with the low pressure setting, and wherein the first and second hydraulic control assemblies are configured to cause both the first isolation valve and the second isolation valve to return to the closed position if either the first low pressure safety pilot valve or the second low pressure safety pilot valve sense that the operating pressure is less than the low pressure setting.

12. The system according to claim 11, further comprising the pressure media container in fluid communication with each low pressure safety pilot valve so that when at least one of the low pressure safety valve senses that the operating pressure is less than the low pressure setting, at least one low pressure safety valve moves from a first position to a second position and the pressure media is drained into the pressure media container, reducing a pressure of the pressure media below the open hydraulic pressure, resulting in both of the isolation valves moving to the closed position.

13. The system according to claim 10, further comprising the pressure media container in fluid communication with each high pressure safety pilot valve so that when at least one of the high pressure safety pilot valves senses that the operating pressure is greater than the high pressure setting, at least one high pressure safety pilot valve moves from a first position to a second position and the pressure media is drained into the pressure media container, reducing a pressure of the pressure media below the open hydraulic pressure, resulting in both of the isolation valves moving to the closed position.

14. The system according to claim 10, further comprising a skid that supports the flowline protection system including the isolation valves, fully rated interconnecting spool pipe, the actuators, and the hydraulic control assemblies, and wherein the system has a first pipeline flange face and a second pipeline flange face for connecting the system to the fully rated pipeline.

15. The system according to claim 10, wherein the system is fully rated to the maximum wellhead shut-in pressure, self contained and stand alone, such that the system is free of a connection to any component other than the fully rated pipeline.

16. A method for protecting a fully rated pipeline, the method comprising:
(a) providing a flowline protection system, the system having a first isolation valve, a second isolation valve, and a first and second hydraulic control assembly, each of the hydraulic control assemblies including a high pressure safety pilot valve with a high pressure setting, and a low pressure safety pilot valve with a low pressure setting;
(b) extending a hydraulic cross-over from the first hydraulic control assembly to the second hydraulic control assembly, the hydraulic cross-over operable to drain a pressure media from one of the first hydraulic control assembly and the second hydraulic control assembly into a media container of the other of the first hydraulic control assembly and the second hydraulic control assembly, reducing a pressure of the pressure media below an open hydraulic pressure so that both the first isolation valve and the second isolation valve move to a closed position, and where the pressure media is separate from the fluid flowing through the fully rated pipeline;
(c) providing a first pressure transfer assembly and a second pressure transfer assembly, each of the pressure transfer assemblies having an unopenable barrier that isolates the fluid of the fully rated pipeline from the pressure media of the first and second hydraulic control assemblies, wherein the first and second pressure transfer assemblies are each in hydraulic communication with both the first high pressure safety pilot valve and the second high pressure safety pilot valve, and convey a magnitude of the operating pressure;

(d) connecting the flowline protection system to the fully rated pipeline so that the first and second isolation valve are in series and are operable to prevent a flow of a fluid through the fully rated pipeline when either the first isolation valve or the second isolation valve is in a closed position, and wherein the flowline protection system is self-contained and free of a connection to any component other than the fully rated pipeline; and (e) flowing the fluid through the fully rated pipeline at an operation pressure and sensing the operating pressure with the high pressure safety pilot valves and the low pressure safety pilot valves so that the first and second hydraulic control assemblies cause both of the isolation valves to return to the closed position if either of the high pressure safety pilot valves sense that the operating pressure is greater than the high pressure setting or if either of the low pressure safety pilot valves sense that the operating pressure is less than the low pressure setting.

17. The method according to claim 16, wherein the flowline protection system has a first hand pump and a second hand pump, the method further comprising before step (e), using the first hand pump to provide the open hydraulic pressure to move the first isolation valve to an open position, and using the second hand pump to provide the open hydraulic pressure to move the second isolation valve to an open position.

18. The method according to claim 17, wherein the flowline protection system has a first actuator associated with the first isolation valve and a second actuator associated the second isolation valve, the method further comprising before step (e), maintaining the first isolation valve in the open position with the pressure media having an open hydraulic pressure applied to the first actuator, and maintaining the second isolation valve in the open position with the pressure media having the open hydraulic pressure applied to the second actuator.

19. The method according to claim 16, wherein the flowline protection system has a pressure gauge installed on an interconnecting spool pipe between the first and second isolation valves, the method further comprising measuring the pressure with the pressure gauge during a functional testing of the flowline protection system to identify a leakage of the first or second isolation valves.

20. The method according to claim 16, wherein the flowline protection system has a first hand pump and a second hand pump, the method further comprising after step (e), resetting the flowline protection system by using the first hand pump to provide the open hydraulic pressure to move the first isolation valve to an open position, and using the second hand pump to provide the open hydraulic pressure to move the second isolation valve to an open position.

21. The method according to claim 16, further comprising protecting a downstream underrated pipeline system from overpressure by interrupting the flow of fluid to the downstream underrated pipeline system when either the first isolation valve or the second isolation valve is in a closed position.

* * * * *